(12) United States Patent
Kang et al.

(10) Patent No.: US 10,091,519 B2
(45) Date of Patent: Oct. 2, 2018

(54) MULTILAYER-BASED IMAGE ENCODING/DECODING METHOD AND APPARATUS

(71) Applicant: Electronics and Telecommunications Research Institute, Daejeon (KR)

(72) Inventors: Jung Won Kang, Daejeon (KR); Jin Ho Lee, Daejeon (KR); Ha Hyun Lee, Seoul (KR); Jin Soo Choi, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 81 days.

(21) Appl. No.: 15/028,570

(22) PCT Filed: Oct. 13, 2014

(86) PCT No.: PCT/KR2014/009580
§ 371 (c)(1),
(2) Date: Apr. 11, 2016

(87) PCT Pub. No.: WO2015/056941
PCT Pub. Date: Apr. 23, 2015

(65) Prior Publication Data
US 2016/0255350 A1    Sep. 1, 2016

(30) Foreign Application Priority Data

Oct. 14, 2013   (KR) .................. 10-2013-0122252
Oct. 17, 2013   (KR) .................. 10-2013-0124205
(Continued)

(51) Int. Cl.
| | | |
|---|---|---|
| H04N 19/13 | (2014.01) | |
| H04N 19/436 | (2014.01) | |
| H04N 19/30 | (2014.01) | |

(52) U.S. Cl.
CPC ........... *H04N 19/436* (2014.11); *H04N 19/30* (2014.11)

(58) Field of Classification Search
CPC .................... H04N 19/30; H04N 19/436
(Continued)

(56) References Cited

U.S. PATENT DOCUMENTS

| | | | | |
|---|---|---|---|---|
| 2011/0170608 A1* | 7/2011 | Shi | ........................ | H04N 19/147 375/240.24 |
| 2012/0106652 A1* | 5/2012 | Huang | ................... | H04N 19/70 375/240.25 |

(Continued)

FOREIGN PATENT DOCUMENTS

| | | |
|---|---|---|
| CN | 105284114 A | 1/2016 |
| KR | 10-2013-0047650 A | 5/2013 |

(Continued)

OTHER PUBLICATIONS

Zhang et al, Video coding using affine motion compensated prediction (Year: 1996).*

(Continued)

*Primary Examiner* — Shan E Elahi
(74) *Attorney, Agent, or Firm* — NSIP Law

(57) ABSTRACT

Disclosed are a method and an apparatus for video decoding that support a plurality of layers. The method for video decoding includes acquiring information indicating whether tile information exists and acquiring the tile information based on the information indicating whether tile information exists.

6 Claims, 6 Drawing Sheets

(30) Foreign Application Priority Data

| Oct. 25, 2013 | (KR) | 10-2013-0127469 |
| Oct. 28, 2013 | (KR) | 10-2013-0128202 |
| Jan. 2, 2014 | (KR) | 10-2014-0000426 |
| Jan. 13, 2014 | (KR) | 10-2014-0004131 |
| Oct. 13, 2014 | (KR) | 10-2014-0137482 |

(58) Field of Classification Search
 USPC .................................................. 375/240.02
 See application file for complete search history.

(56) References Cited

U.S. PATENT DOCUMENTS

| 2013/0034159 | A1* | 2/2013 | Siekmann | H04N 19/176 |
| | | | | 375/240.12 |
| 2013/0083850 | A1 | 4/2013 | Alshina et al. | |
| 2013/0251051 | A1* | 9/2013 | Ikai | H04N 19/0089 |
| | | | | 375/240.29 |
| 2014/0161189 | A1* | 6/2014 | Zhang | H04N 19/597 |
| | | | | 375/240.16 |
| 2014/0301463 | A1* | 10/2014 | Rusanovskyy | H04N 19/52 |
| | | | | 375/240.14 |
| 2015/0304667 | A1* | 10/2015 | Suehring | H04N 19/70 |
| | | | | 375/240.02 |
| 2015/0373344 | A1* | 12/2015 | Wang | H04N 19/59 |
| | | | | 375/240.02 |
| 2016/0080753 | A1 | 3/2016 | Oh | |

FOREIGN PATENT DOCUMENTS

| KR | 10-2013-0079261 A | 7/2013 |
| WO | WO 2012/088211 A1 | 6/2012 |
| WO | WO 2013/042884 A1 | 3/2013 |

OTHER PUBLICATIONS

International Search Report dated Jan. 5, 2015 in counterpart International Application No. PCT/KR2014/009580 (7 pages in Korean with English translation).

Bross, Benjamin, et al. "High Efficiency Video Coding (HEVC) Text Specification Draft 10 (for FDIS & Last Call)." *Joint Collaborative Team on Video Coding (JCT-VC) of ITU-T SG 16 WP 3 and ISO/IEC JTC 1/SC 29/WG 11*, 12th Meeting, Geneva,(Jan. 2013). 2013. (5 pages, in English).

Deshpande, Sachin, et al. "On Tile Alignment." Document: JCTVC N 199: 1-7. 2013. (9 pages, in English).

\* cited by examiner

MULTILAYER-BASED IMAGE ENCODING/DECODING METHOD AND APPARATUS

CROSS-REFERENCE TO RELATED APPLICATIONS

This application is a U.S. National Stage Application of International Application No. PCT/KR2014/009580, filed on Oct. 13, 2014, which claims the benefit under 35 USC 119(a) and 365(b) of Korean Patent Application No. 10-2013-0122252, filed on Oct. 14, 2013, Korean Patent Application No. 10-2013-0124205, filed on Oct. 17, 2013, Korean Patent Application No. 10-2013-0127469, filed on Oct. 25, 2013, Korean Patent Application No. 10-2013-0128202, filed on Oct. 28, 2013, Korean Patent Application No. 10-2014-0000426, filed on Jan. 2, 2014, Korean Patent Application No. 10-2014-0004131, filed on Jan. 13, 2014, and Korean Patent Application No. 10-2014-0137482, filed on Oct. 13, 2014 in the Korean Intellectual Property Office.

TECHNICAL FIELD

The present invention relates to video encoding and decoding, and more particularly, to a method of expressing a tile and a picture when one or more layers exist in a video bitstream.

BACKGROUND ART

In recent years, while a multimedia environment has been built up, various terminals and networks have been used and as a result, user's requirements have been diversified.

For example, as performance and computing capability of terminals have been diversified, supported performance has also been diversified for each apparatus. Further, in the case of a network in which information is transmitted, a pattern, an amount, a speed, and the like of transmitted information as well as an external structure such as wired and wireless networks have been diversified for each function. A user has selected a terminal and a network to be used according to a desired function and further, spectrums of a terminal and a network which an enterprise provides to the user have been diversified.

In this regard, in recent years, as a broadcast having a high definition (HD) resolution has been extended and serviced worldwide as well as domestically, a lot of users have been familiar with high-definition and high-quality videos. As a result, organizations associated with a lot of video services have made a lot of efforts to develop next-generation video apparatuses.

Further, as the interest in ultra high definition (UHD) having four times higher resolution than an HDTV as well as the HDTV has been increased, a requirement for technology that compresses and processes higher-resolution and higher-definition videos has been further increased.

In order to compress and process the video, inter prediction technology of predicting a pixel value included in a current video from a temporally prior and/or post video, intra prediction technology of predicting another pixel value included in the current video by using pixel information in the current video, and entropy encoding technology of allocating a short sign to a symbol in which an appearance frequency is high and a long sign to a symbol in which the appearance frequency is low, and the like may be used.

As described above, when respective terminals and networks having different supported functions, and the diversified user requirements are considered, a quality, a size, a frame, and the like of a supported video need to be consequently diversified.

As such, due to heterogeneous communication networks, and terminals having various functions and various types of terminals, scalability that variously supports the quality, resolution, size, frame rate, and the like of the video becomes a primary function of a video format.

Accordingly, it is necessary to provide a scalability function so as to achieve video encoding and decoding in terms of time, space, video quality, and the like in order to provide a service required by the user under various environments based on a high-efficiency method for video encoding.

DISCLOSURE

Technical Problem

An object of the present invention is to provide a method and an apparatus for video encoding/decoding capable of improving video encoding/decoding efficiency.

Another object of the present invention is to provide a method and an apparatus of signaling tile information in scalable video coding capable of improving encoding/decoding efficiency.

Yet another object of the present invention is to provide a method and an apparatus of signaling representation format information in scalable video coding capable of improving encoding/decoding efficiency.

Technical Solution

In accordance with an embodiment of the present invention, there is provided a method for video decoding that supports a plurality of layers. The method for video decoding includes acquiring information indicating whether tile information exists and acquiring the tile information based on the information indicating whether tile information exists.

The tile information may be information representing whether locations of tiles existing in a picture of a current layer collocate with locations of tiles existing in a picture of a reference layer referred to by the current layer.

In accordance with another embodiment of the present invention, there is provided a method for video decoding supporting a plurality of layers. The method for video decoding includes acquiring information indicating whether chroma format information and bit-depth information exist and acquiring the chroma format information and the bit-depth information based on the information indicating whether the chroma format information and the bit-depth information exist.

Advantageous Effects

According to the embodiments of the present invention, when each layer is configured by one or more tiles in a layered bitstream, parallel encoding/decoding of the layered bitstream may be performed through signaling for a correlation between the layers, and encoding/decoding of an area of interest constituted by the tiles may be easily performed. Further, encoding/decoding efficiency may be improved by efficiently signaling picture representation information.

MODE FOR INVENTION

Hereinafter, embodiments of the present invention will be described in detail with reference to the accompanying drawings. In describing the embodiments of the present specification, when it is determined that the detailed description of the known art related to the present invention may obscure the gist of the present invention, the corresponding description thereof may be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Moreover, a content of describing "including" a specific component in the specification does not exclude a component other than the corresponding component and means that an additional component may be included in the embodiments of the present invention or the scope of the technical spirit of the present invention.

Terms such first, second, and the like may be used to describe various components, but the components are not limited by the terms. The above terms are used only to discriminate one component from the other component. For example, without departing from the scope of the present invention, a first component may be referred to as a second component, and similarly, a second component may be referred to as a first component.

Further, components described in the embodiments of the present invention are independently illustrated in order to show different characteristic functions and each component is not constituted by separated hardware or one software constituting unit. That is, each component includes respective components which are arranged for easy description and at least two components of the respective components may constitute one component or one component is divided into a plurality of components which may perform their functions. Even an integrated embodiment and separated embodiments of each component is also included in the scope of the present invention without departing from the spirit of the present invention.

Further, some components are not requisite components that perform essential functions but selective components for just improving performance in the present invention. The present invention may be implemented with the requisite component for implementing the spirit of the present invention other than the component used to just improve the performance and a structure including only the requisite component other than the selective component used to just improve the performance is also included in the scope of the present invention.

Figure 1:
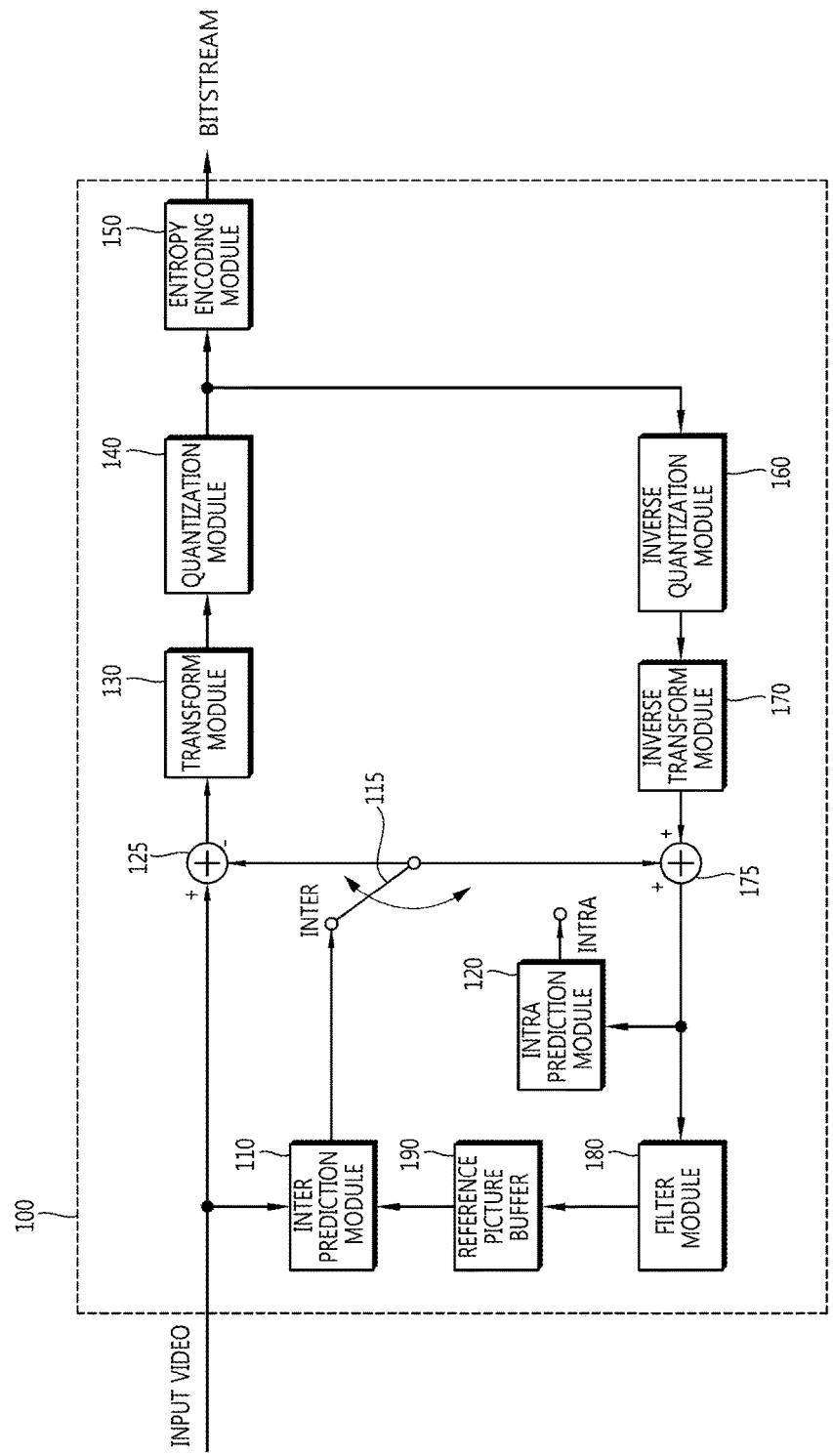
FIG. 1 is a block diagram illustrating a configuration of an apparatus for video encoding according to an embodiment of the present invention.

FIG. 1 is a block diagram illustrating a configuration of an apparatus for video encoding according to an embodiment of the present invention.

A scalable apparatus for video encoding that supports a multi-layer structure may be implemented by extending a general apparatus for video encoding having a single-layer structure. The block diagram of FIG. 1 illustrates an embodiment of an apparatus for video encoding which may be a basis of the scalable apparatus for video encoding which may be applied to the multi-layer structure.

Referring to FIG. 1, a for video encoding includes an inter prediction module 110, an intra prediction module 120, a switch 115, a subtractor 125, a transform module 130, a quantization module 140, an entropy encoding module 150, an inverse quantization module 160, an inverse transform module 170, an adder 175, a filter module 180, and a reference picture buffer 190.

The apparatus 100 for video encoding may encode an input video in an intra mode or an inter mode and output a bitstream.

In the intra mode, the switch 115 may be switched to intra, and in the inter mode, the switch 115 may be switched to inter. The intra prediction means an intra-screen prediction, and the inter prediction means an inter-screen prediction. The apparatus 100 for video encoding may generate a prediction block for an input block of the input video and thereafter, encode a residual between the input block and the prediction block. In this case, the input video may mean an original picture.

In the intra mode, the intra prediction module 120 may a sample value of an already encoded/decoded block around a current block as a reference sample. The intra prediction module 120 may perform the spatial prediction by using the reference sample to generate prediction samples for the current block.

In the inter mode, the inter prediction module 110 may acquire a motion vector by specifying a reference block having the smallest difference from the input block (current block) in the reference picture stored in the reference video buffer 190 during a motion prediction process. The inter prediction module 110 corrects a motion by using the motion vector and the reference picture stored in the picture buffer 190 to generate the prediction block for the current block.

In case of the multi-layer structure, the inter prediction applied in the inter mode may include the inter-layer prediction. The inter prediction module 110 configures an inter-layer reference picture by sampling a picture of the reference layer and encapsulates the inter-layer reference picture in the reference picture list to perform the inter-layer prediction. An inter-layer reference relationship may be signaled through information that specifies inter-layer dependence.

Meanwhile, when the current layer picture and the reference layer picture have the same size, sampling applied to the reference layer picture may mean generation of a reference sample by sample copying from the reference layer picture. When the current layer picture and the reference layer picture have different resolutions, the sampling applied to the reference layer picture may mean up-sampling.

For example, as a case in which layers have different resolutions, the inter-layer reference picture may be configured by up-sampling the reconstructed picture of the reference layer between layers that support scalability regarding the resolution.

Which layer the inter-layer reference picture is configured by using a picture of may be determined by considering encoding cost and the like. The encoding apparatus may transmit, to the decoding apparatus, information that specifies the layer to which the picture to be used as the inter-layer reference picture belongs.

Further, a picture used to predict the current block within a layer which is referred to in the inter-layer prediction, that is, the reference layer may be a picture of the same access unit (AU) as the current picture (a prediction target picture within the current layer).

The subtractor 125 may generate a residual block by a residual between the input block and the generated prediction block.

The transform module 130 transforms the residual block to output a transform coefficient. Herein, the transform coefficient may mean a coefficient value generated by transforming the residual block and/or a residual signal. Hereinafter, in this specification, a quantized transform coefficient level generated when the transform coefficient is quantized may also be called the transform coefficient.

When a transform skip mode is applied, the transform module 130 may skip transforming the residual block.

The quantization module 140 quantizes an input transform coefficient according to a quantization parameter to output a quantized coefficient. The quantized coefficient may also be called the quantized transform coefficient level. In this case, the quantization module 140 may quantize the input transform coefficient by using a quantization matrix.

The entropy encoding module 150 performs entropy-encoding values calculated by the quantization module 140 or an encoded parameter value calculated during encoding according to probability distribution to output the bitstream. The entropy encoding module 150 may entropy-encode information (for example, a syntax element, and the like) for video encoding in addition to pixel information of the video.

The encoding parameter is a parameter required for encoding and decoding, and may include information encoded in the encoding apparatus to be transferred to the decoding apparatus like the syntax element and information to be inferred during the encoding or decoding process.

For example, the encoding parameter may include values or statistics of an intra/inter prediction mode, a movement/motion vector, a reference video index, an encoding block pattern, presence of a residual signal, a transform coefficient, a quantized transform coefficient, a quantization parameter, a block size, block segment information, and the like.

The residual signal may mean a difference between an original signal and a prediction signal, and may also mean a signal having a transformed form of the difference between the original signal and the prediction signal or a signal having a transformed and quantized form of the difference between the original signal and the prediction signal. The residual signal may be referred to as a residual block in a block unit.

In the case where the entropy encoding is applied, a few of bits are allocated to a symbol having high occurrence probability and a lot of bits are allocated to a symbol having low occurrence probability to express the symbols, and as a result, a size of a bitstream for symbols to be encoded may be reduced. Accordingly, compression performance of video encoding may be enhanced through the entropy encoding.

The entropy encoding module 150 may use encoding methods such as exponential-golomb, context-adaptive variable length coding (CAVLC), and context-adaptive binary arithmetic coding (CABAC) for the entropy encoding. For example, the entropy encoding module 150 may perform entropy-encoding by using a variable length coding/code (VLC) table. Further, the entropy encoding module 150 derives a binarization method of a target symbol and a probability model of a target symbol/bin, and then may also perform the entropy-encoding by using the derived binarization method or probability model.

Since the apparatus 100 for video encoding according to the embodiment of FIG. 1 performs inter prediction encoding, that is, inter-screen prediction encoding, a currently encoded video needs to be decoded and stored so as to be used as the reference video. Accordingly, the quantized coefficient may be inversely quantized in the inverse quantization module 160 and inversely transformed in the inverse transform module 170. The inversely quantized and inversely transformed coefficient is added to the prediction block by the adder 175 and a reconstructed block is generated.

The reconstructed block passes though the filter module 180, and the filter module 180 may apply at least one of a deblocking filter, a sample adaptive offset (SAO), and an adaptive loop filter (ALF) to the reconstructed block or a reconstructed picture. The filter module 180 may be called an adaptive in-loop filter. The deblocking filter may remove block distortion which occurs on a boundary between blocks. The SAO may add an appropriate offset value to a pixel value in order to compensate for coding error. The ALF may perform filtering based on a value acquired by comparing the reconstructed video and the original video. The reconstructed block which passes through the filter module 180 may be stored in the reference video buffer 190.

Figure 2:
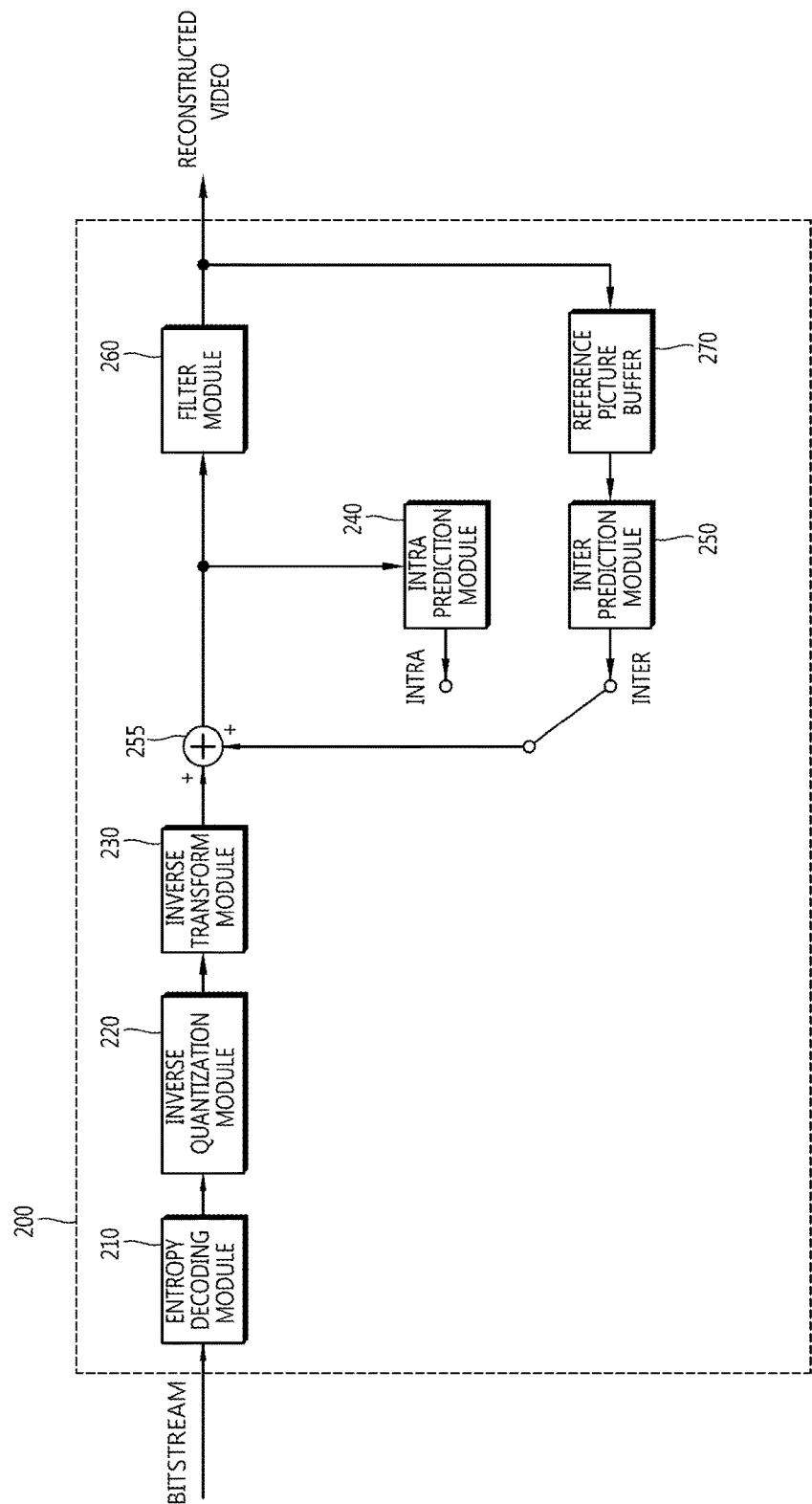
FIG. 2 is a block diagram illustrating a configuration of an apparatus for video decoding according to an embodiment of the present invention.

FIG. 2 is a block diagram illustrating a configuration of an apparatus for video decoding according to an embodiment of the present invention.

An apparatus for scalable video decoding that supports the multi-layer structure may be implemented by extending a general apparatus for video decoding having a single-layer structure. The block diagram of FIG. 2 illustrates an embodiment of an apparatus for video decoding which may be a basis of the apparatus for scalable video decoding which may be applied to the multi-layer structure.

Referring to FIG. 2, an apparatus 200 for video decoding includes an entropy decoding module 210, an inverse quantization module 220, an inverse transform module 230, an intra prediction module 240, an inter prediction module 250, an adder 255, a filter module 260, and a reference picture buffer 270.

The apparatus 200 for video decoding may receive a bitstream output by an encoder and decodes the received bitstream in the intra mode or the inter mode, and output the modified video, that is, the reconstructed video.

In the intra mode, the switch may be switched to intra, and in the inter mode, the switch may be switched to inter.

The apparatus 200 for video decoding may acquire a reconstructed residual block from the received bitstream and generate a prediction block and then generate a block modified by adding the reconstructed residual block and the prediction block, that is, the reconstruction block.

The entropy decoding module 210 entropy-decodes the input bitstream according to probability distribution to generate information on a quantized coefficient and a syntax element.

The quantized coefficient is inversely quantized by the inverse quantization module 220 and inversely transformed by the inverse transform module 230. The quantized coefficient is inversely quantized/inversely transformed, and as a result, the reconstructed residual block may be generated.

In this case, the inverse quantization module 220 may apply a quantization matrix to the quantized coefficient.

In the intra mode, the intra prediction module 240 may perform a spatial prediction by using a sample value of an already decoded block around the current block and generate prediction samples for the current block.

In the inter mode, the inter prediction module 250 compensates for a motion by using a motion vector and a reference picture stored in the reference picture buffer 270 to generate the prediction block for the current block.

In case of the multi-layer structure, the inter prediction applied in the inter mode may include the inter-layer prediction. The inter prediction module 250 configures an inter-layer reference picture by sampling a picture of the reference layer and encapsulates the inter-layer reference picture in the reference picture list to perform the inter-layer prediction. An inter-layer reference relationship may be signaled through information that specifies inter-layer dependence.

Meanwhile, when the current layer picture and the reference layer picture have the same size, sampling applied to the reference layer picture may mean generation of a reference sample by sample copying from the reference layer picture. When the current layer picture and the reference layer picture have different resolutions, the sampling applied to the reference layer picture may mean up-sampling.

For example, as a case in which layers have different resolutions, when the inter-layer prediction is applied between the layers that supports scalability regarding the resolution, the inter-layer reference picture may be configured by up-sampling the reconstructed picture of the reference layer.

In this case, information that specifies the layer to which the picture to be used as the inter-layer reference picture belongs may be transmitted from the encoding apparatus to the decoding apparatus.

Further, a picture used to predict the current block within a layer which is referred to in the inter-layer prediction, that is, the reference layer may be a picture of the same access unit (AU) as the current picture (a prediction target picture within the current layer).

The reconstructed residual block and the prediction block are added by the adder 255, and as a result, the reconstructed block may be generated. In other words, a residual sample and a prediction sample are added to each other, and as a result, a reconstructed sample or a reconstructed picture is generated.

The reconstructed picture is filtered by the filter module 260. The filter module 260 may apply at least one of a deblocking filter, an SAO, and an ALF to the reconstructed block or the reconstructed picture. The filter module 260 outputs a modified or filtered reconstructed picture. The reconstructed video is stored in the reference picture buffer 270 to be used in the inter prediction.

Further, the apparatus 200 for video decoding may further include a parsing unit (not illustrated) parsing information regarding the encoded video included in the bitstream. The parsing unit may include the entropy decoding module 210, and may also be included in the entropy decoding module 210. The parsing unit may also be implemented as one constituent element of the decoding unit.

Although it has been described that one encoding apparatus/decoding apparatus processes encoding/decoding of multi-layers in FIGS. 1 and 2, it is for easy description and the encoding apparatus/decoding apparatus may be configured for each layer.

In this case, the encoding apparatus/decoding apparatus of an upper layer may perform encoding/decoding of the corresponding upper layer by using information of the upper layer and information of the lower layer. For example, the prediction unit (inter prediction unit) of the upper layer may perform the intra-prediction or inter-prediction for the current block by using pixel information or picture information of the upper layer, and perform the inter-prediction (inter-layer prediction) of the current block of the upper layer by receiving the reconstructed picture information from the lower layer and using the same. Herein, only the inter-layer prediction has been described as an example, but the encoding apparatus/decoding apparatus may perform encoding/decoding for a current layer by using information of another layer, no matter what the encoding apparatus/decoding apparatus are configured for each layer or one apparatus processes the multi-layers.

In the present invention, the layer may include a view. In this case, in the case of the inter-layer prediction, the prediction of the upper layer is not just performed by using the information of the lower layer, but the inter-layer prediction may be performed by using information of another layer among layers that are specified to be dependent by information that specifies inter-layer dependence.

Figure 3:
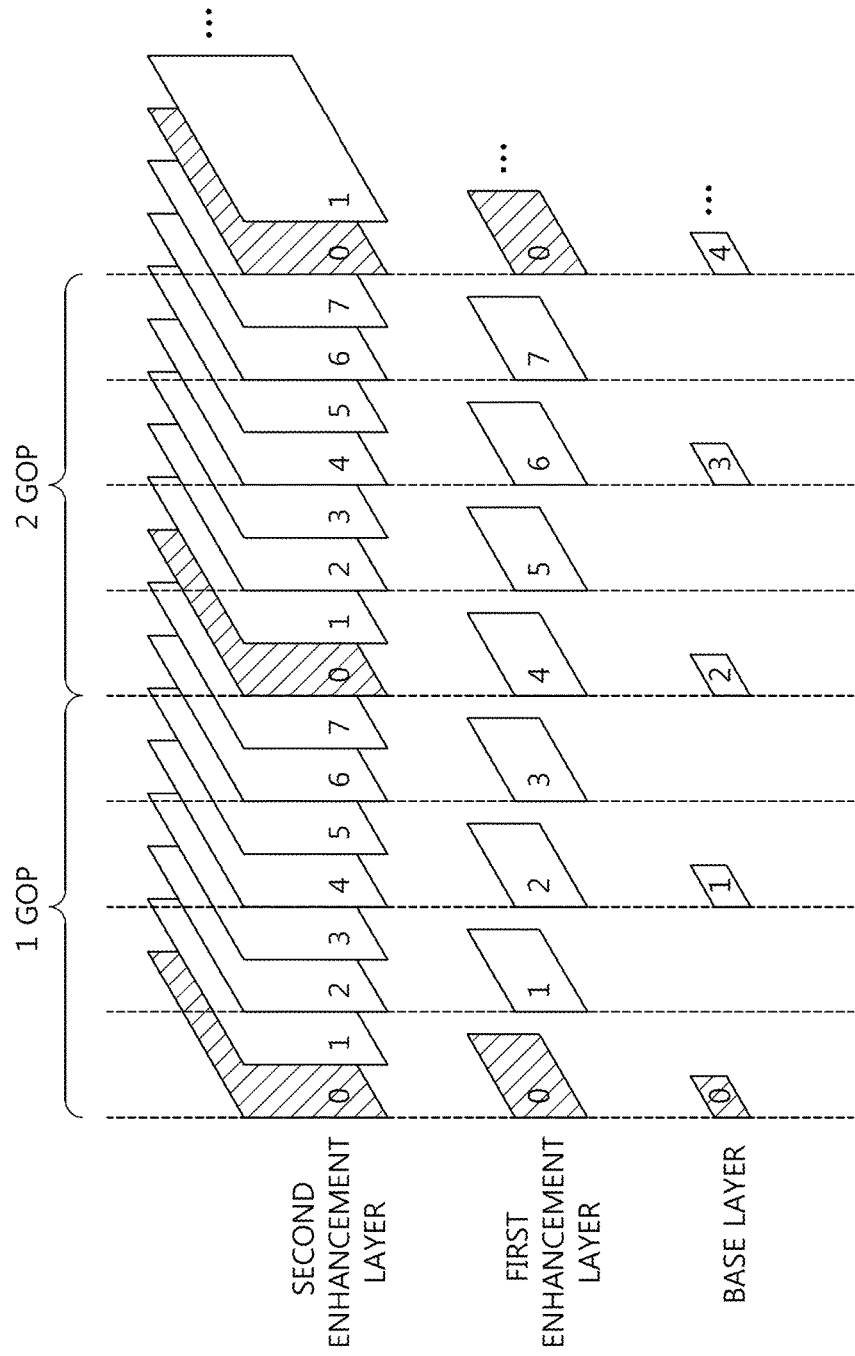
FIG. 3 is a conceptual diagram schematically illustrating a scalable video coding structure using a plurality of layers according to an embodiment of the present invention.

FIG. 3 is a conceptual diagram schematically illustrating a scalable video coding structure using a plurality of layers according to an embodiment of the present invention. In FIG. 3, a group of picture (GOP) represents a picture group, that is, a group of pictures.

A transmission medium is required to transmit video data and performance thereof varies for each transmission medium according to various network environments. A scalable video coding method may be provided to be applied to various transmission media or network environments.

The video coding method (hereinafter, referred to as 'scalable coding' or 'scalable video coding') supporting the scalability is a coding method that increases encoding and decoding performance by removing inter-layer redundancy by using inter-layer texture information, motion information, a residual signal, and the like. The scalable video coding method may provide various scalabilities in spatial, temporal, quality, and view terms according to surrounding conditions such as transmission bit rate, transmission error rate, and a system resource.

The scalable video coding may be performed by using a multiple-layer structure so as to provide a bitstream which is applicable to various network situations. For example, the scalable video coding structure may include a base layer that compresses and processes the video data by using a general method for video decoding, and may include an enhancement layer that compresses and processes the video data by using both decoding information of the base layer and the general video decoding method.

The base layer may be referred to as a base layer or a lower layer. The enhancement layer may be designated as an enhancement layer or an upper layer. In this case, the lower layer may mean a layer supporting scalability (spatial, temporal, quality, or view scalability) having a lower level than a specific layer, and the upper layer may mean a layer supporting scalability (spatial, temporal, quality, or view scalability) having a higher level than the specific layer. Further, a layer referred to for encoding/decoding of a different layer may be called a reference layer and a layer encoded/decoded by using the different layer may be a current layer. The reference layer may be a lower layer than the current layer and the current layer may be an upper layer than the reference layer.

Herein, the layer means a set of videos and bitstreams that are distinguished based on the spatial (for example, a video size), the temporal (for example, a decoding order, a video output order, and frame rate), the quality, the complexity, and the view.

Referring to FIG. 3, for example, the base layer may be defined as standard definition (SD), a frame rate of 15 Hz, and a bit rate of 1 Mbps, and a first enhancement layer may be defined as high definition (HD), a frame rate of 30 Hz, and a bit rate of 3.9 Mbps, and a second enhancement layer may be defined as ultra high definition (4K-UHD), a frame rate of 60 Hz, and a bit rate of 27.2 Mbps.

The format, the frame rate, the bit rate, and the like as one embodiment may be determined differently as necessary. Further, the number of used layers is not limited to the embodiment and may be determined differently according to a situation. For example, if a transmission bandwidth is 4 Mbps, data may be transmitted at 15 Hz or less by decreasing the frame rate of the first enhancement layer HD.

The scalable video coding method may provide spatial, temporal, quality, and view scalabilities by the method described in the embodiment of FIG. 3. In this specification, the scalable video coding has the same meaning as the scalable video encoding in terms of encoding and the scalable video decoding in terms of decoding.

In a high efficiency video coding (HEVC) standard, there is a method in which one picture is segmented in a tile format to be independently encoded. In other words, one picture is divided in to a plurality of tiles and each tile divided in one picture is independently encoded/decoded to be parallel-processed. Accordingly, information indicating how the picture in the bitstream is configured in a tile format is required, and in the HEVC, the tile information is to be described in a picture parameter set (PPS). Further, in the HEVC, picture representation information, for example, spatial resolution, chroma format, and bit depth information is to be described in a sequence parameter set (SPS).

In the case of scalable video coding which is a video standard extending the HEVC in order to provide scalability, the plurality of layers may exist in the bitstream, and a correlation between the layers may exist. Accordingly, in a layered bitstream, when a picture is configured by one or more tiles in each layer, the present invention provides a method for efficiently encoding/decoding tile information through signaling for the correlation between the layers. Further, the present invention provides a method for efficiently signaling the picture representation information in scalable vide coding.

Tile Information

A tile means a rectangular region constituted by coding tree blocks or coding tree units in one picture and may be a sequence of the coding tree blocks or the coding tree units. The tile is always configured by integer number of coding tree units. Herein, the coding tree block or coding tree unit may be a processing unit of samples in the picture.

For example, one picture may be divided into two tiles by a vertical tile boundary in the picture. Each divided tile includes the integer number of coding tree units and may be a rectangular region.

In a scalable HEVC (SHVC) which is a standard for supporting scalable video coding and a multiview HEVC (MV-HEVC) for supporting a multiview, the tile information may be signaled in the video parameter set (VPS) and the PPS. Particularly, in the VPS, there is flag information indicating whether encoding/decoding is performed so that locations of tiles included in the corresponding layer collocate/coincide with locations of tiles included in reference layers of the corresponding layer. In this case, when a spatial resolution of the reference layer does not same as a spatial resolution of the corresponding layer, the spatial resolution of the reference layer is scaled to be the same as the spatial resolution of the corresponding layer, and it may be determined whether the locations of the tiles of the corresponding layer collocate/coincide with the locations of the tiles included in the scaled reference layer.

The fact that the locations among the tiles collocate/coincide with each other means that boundaries of the tiles collocate/coincide with each other. Accordingly, as a flag indicating whether encoding/decoding is performed so that the locations of the tiles included in the corresponding layer collocate/coincide with the locations of the tiles included in the reference layers of the corresponding layer, the tile_boundaries_aligned_flag[i][j] may be used. The tile_boundaries_aligned_flag[i][j] indicates whether an i-th layer coincides with a j-th reference layer in a location of the tile (boundary of the tile). However, in the case where the only one tile is included for each layer in the entire bitstream, the tile_boundaries_aligned_flag[i][j needs not to be signaled.

Accordingly, only when there is a picture including at least two tiles, it may be efficient to signal the tile_boundaries_aligned_flag[i][j].

Hereinafter, in the present invention, as a method of efficiently signaling the tile_boundaries_aligned_flag[i][j], a syntax will be described as an example.

Table 1 is an example of the syntax illustrating a method of signaling the tile_boundaries_aligned_flag[i][j] according to the embodiment of the present invention.

TABLE 1

| | Descriptor |
|---|---|
| vps_vui( ){ | |
| ... | |
|    vps_tiles_enabled_flag | u(1) |
|    if (vps_tiles_enabled_flag) | |
|      for( i = 1; i <= vps_max_layers_minus1; i++ ) | |
|        for( j = 0; j < NumDirectRefLayers[ | |
|        layer_id_in_nuh[ i ] ]; j++ ) { | |
|          tile_boundaries_aligned_flag[ i ][ j ] | u(1) |
|        } | |
| ... | |
| } | |

Referring to Table 1, when vps_tiles_enabled_flag has a value of 1, the picture including two or more tiles among pictures referring to the corresponding VPS may exist. When vps_tiles_enabled_flag has a value of 0, all pictures of a coded video stream (CVS) include only one tile.

For example, when vps_tiles_enabled_flag is 1, tile_boundaries_aligned_flag[i][j] may be signaled.

Table 2 is another example of the syntax illustrating a method of signaling the tile_boundaries_aligned_flag[i][j] according to the embodiment of the present invention.

TABLE 2

| | Descriptor |
|---|---|
| vps_vui( ){ | |
| ... | |
|    tiles_not_in_use_flag | u(1) |
|    if (!tiles_not_in_use_flag) | |
|      for( i = 1; i <= vps_max_layers_minus1; i++ ) | |
|        for( j = 0; j < NumDirectRefLayers[ | |
|        layer_id_in_nuh[ i ] ]; j++ ) { | |
|          tile_boundaries_aligned_flag[ i ][ j ] | u(1) |

TABLE 2-continued

| | Descriptor |
|---|---|
| } | |
| ... | |
| } | |

Referring to Table 2, when tiles_not_in_use_flag has a value of 1, all pictures of the CVS include only one tiles. When tiles_not_in_use_flag has a value of 0, the picture including two or more tiles among pictures referring to the corresponding VPS may exist.

For example, when tiles_not_in_use_flag is 0, tile_boundaries_aligned_flag[i][j] may be signaled.

Table 3 is yet another example of the syntax illustrating a method of signaling the tile_boundaries_aligned_flag[i][j] according to the embodiment of the present invention.

TABLE 3

| | Descriptor |
|---|---|
| vps_vui( ){ | |
| ... | |
|   for( i = 1; i <= vps_max_layers_minus1; i++ ) { | |
|     vps_tiles_enabled_flag[i] | u(1) |
|     If(vps_tiles_enabled_flag[i]) { | |
|       for( j = 0; j < NumDirectRefLayers[ | |
|       layer_id_in_nuh[ i ] ]; j++ ) { | |
|         tile_boundaries_aligned_flag[ i ][ j ] | u(1) |
|       } | |
|     } | |
|   } | |
| } | |

Referring to Table 3, when vps_tiles_enabled_flag[i] has a value of 1, each picture of the i-th layer includes at least two tiles. When vps_tiles_enabled_flag has a value of 0, all pictures of the i-th layer include only one tile.

For example, when vps_tiles_enabled_flag is 1, tile_boundaries_aligned_flag[i][j] may be signaled.

Table 4 is an example of a syntax illustrating a signaling method in the PPS by using vps_tiles_enabled_flag signaled in the VPS in Table 1 according to the embodiment of the present invention.

TABLE 4

| | Descriptor |
|---|---|
| pic_parameter_set_rbsp( ){ | |
| ... | |
|   if( vps_tiles_enabled_flag ) | |
|     tiles_enabled_flag | u(1) |
| ... | |
| } | |

Referring to Table 4, when tiles_enabled_flag has a value of 1, all the pictures referring to the corresponding PPS include two or more tiles. When tiles_enabled_flag has a value of 0, all pictures of referring to the PPS include only one tile. If the tiles_enabled_flag value is not signaled, it is assumed that the tiles_enabled_flag value is 0.

Like Table 4, whether tiles_enabled_flag is signaled by vps_tiles_enabled_flag may be determined. However, regardless of vps_tiles_enabled_flag, like Table 5, in the case where tiles_enabled_flag is signaled, the value of tiles_enabled_flag may be 1 only when the value of vps_tiles_enabled_flag is 1. In other words, when the value of vps_tiles_enabled_flag is 0, the value of tiles_enabled_flag should be always 0.

TABLE 5

| | Descriptor |
|---|---|
| pic_parameter_set_rbsp( ){ | |
| ... | |
|   tiles_enabled_flag | u(1) |
| ... | |
| } | |

Table 6 is an example a syntax illustrating a method of signaling sps_tiles_enabled_flag without signaling of vps_tiles_enabled_flag in the SPS according to the embodiment of the present invention.

TABLE 6

| | Descriptor |
|---|---|
| seq_parameter_set_rbsp( ) | |
| ... | |
|   sps_tiles_enabled_flag | u(1) |
| ... | |
| } | |

Referring to Table 6, when sps_tiles_enabled_flag has a value of 1, all the pictures referring to the corresponding SPS include two or more tiles. When sps_tiles_enabled_flag has a value of 0, all pictures of referring to the SPS include one tile.

In association with Table 6, in the PPS, tiles_enabled_flag may also be signaled like the following Table 7 instead of Table 4.

TABLE 7

| | Descriptor |
|---|---|
| pic_parameter_set_rbsp( ) { | |
| ... | |
|   if( sps_tiles_enabled_flag ) | |
|     tiles_enabled_flag | u(1) |
| } | |

Revision of Tile-Enabled Flag in PPS

According to the HEVC standard, tiles_enabled_flag has the following constraints.

"With respect to all PPSs activated in the coded video stream (CVS), tiles_enabled_flag should have the same value."

According to the constraints, in the present invention, in order to coherently simplify the PPSs included in the CVS, when a value of a layer identifier nuh_layer_id is larger than 0, a method of signaling tiles_enabled_flag in the SPS without signaling tiles_enabled_flag in the PPS is proposed.

Table 8 is an example of a syntax illustrating a method of signaling tiles_enabled_flag in the SPS based on layer identifier nuh_layer_id information according to the embodiment of the present invention.

TABLE 8

| | Descriptor |
|---|---|
| seq_parameter_set_rbsp( ) { | |
| ... | |
|   if( nuh_layer_id > 0 ) | |

TABLE 8-continued

| | Descriptor |
|---|---|
| sps_tiles_enabled_flag | u(1) |
| } | |

The meaning of the syntaxes illustrated in Table 8 is the same as those described above, and herein, the description of the syntax will be omitted.

Table 9 is another example of a syntax illustrating a method of signaling tiles_enabled_flag in the SPS based on layer identifier nuh_layer_id information according to the embodiment of the present invention.

TABLE 9

| | Descriptor |
|---|---|
| pic_parameter_set_rbsp( ) { | |
| ... | |
| if( nuh_layer_id == 0 ) | |
| tiles_enabled_flag | u(1) |
| } | |

Referring to Table 9, when tiles_enabled_flag has a value of 1, all the pictures referring to the corresponding PPS include two or more tiles. When sps_tiles_enabled_flag has a value of 0, all the pictures referring to the corresponding PPS include only one tile. If the value of tiles_enabled_flag is not signaled, the value of tiles_enabled_flag is inferred as the value of sps_tiles_enabled_flag.

In this case, the value of tiles_enabled_flag needs to have the same value in all the PPSs activated in a specific layer of the CVS.

Tile Information in VPS

Any CVSs may be complicated to be decoded in real time in some decoders. If the tile information is transferred to the decoder, the decoder may determine in advance whether the corresponding CVS may be decoded. That is, in the VPS, the signaled tile information may be used for session negotiation. Further, if the pictures in the specific layer have the same tile setting, that is, the same default tile shape, the tile information in all the PPSs needs not to be signaled.

Accordingly, in the present invention, in the VPS, generally, describing the default tile information or information on a maximum and minimum number of tiles is proposed.

First Embodiment

Table 10 is an example of the syntax illustrating a method of signaling tile information in a VPS according to the embodiment of the present invention.

TABLE 10

| | Descriptor |
|---|---|
| vps_vui( ){ | |
| ... | |
| tiles_not_in_use_flag | u(1) |
| if( tiles_not_in_use_flag ) { | |
| for( i = 0; i <= vps_max_layers_minus1; i++ ) { | |
| tiles_in_use_flag[i] | u(1) |
| if(tiles_in_use_flag[i]){ | |
| default_tile_info_flag[i] | u(1) |
| if(default_tile_setting_flag[i]) { | |
| num_tile_columns_minus1[ i ] | ue(v) |
| num_tile_rows_minus1[ i ] | ue(v) |
| uniform_spacing_flag[ i ] | u(1) |
| if( !uniform_spacing_flag [ i ]) { | |
| for( j = 0; j < num_tile_columns_minus1; j++ ) | |
| column_width_minus1[ i ][ j ] | ue(v) |
| for( j = 0; j < num_tile_rows_minus1; j++ ) | |
| row_height_minus1[ i ][ j ] | ue(v) |
| } | |
| loop_filter_across_tiles_enabled_flag[ i ] | u(1) |
| } | |
| } | |
| } | |
| } | |
| ... | |
| } | |

Referring to Table 10, when tiles_not_in_use_flag has a value of 1, all pictures of the CVS include only one tiles. When tiles_not_in_use_flag has a value of 0, the picture including two or more tiles among pictures referring to the corresponding VPS may exist.

When default_tile_info_flag[i] has a value of 1, the picture of the i-th layer has a default tile setting. When default_tile_info_flag[i] has a value of 0, the picture of the i-th layer may have the default tile setting or not.

A value of num_tile_columns_minus1[i] plus 1 represents the number of tile columns partitioning the picture of the i-th layer. When num_tile_columns_minus1[i] is not signaled, it is assumed that num_tile_columns_minus1[i] is 0.

A value of num_tile_rows_minus1[i] plus 1 represents the number of tile rows partitioning the picture of the i-th layer. When num_tile_rows_minus1[i] is not signaled, it is assumed that num_tile_rows_minus1[i] is 0.

When uniform_spacing_flag[i] has a value of 1, the tile columns and the tile rows in the picture of the i-th layer are positioned at predetermined intervals. When uniform_spacing_flag[i] has a value of 0, the tile columns and the tile rows in the picture of the i-th layer are not positioned at predetermined intervals. In this case, a width of the column and a height of the row may be signaled by column_width_minus1[i][j] and row_height_minus1[i][j] of each tile. When the value of uniform_spacing_flag does not exist, it may be assumed that the value of uniform_spacing_flag is 1.

A value of column_width_minus1[i][j] plus 1 is to represent a width of a column of a j-th tile of the i-th layer by a coding tree block unit.

A value of row_height_minus1[i][j] plus 1 is to represent a height of a row of a j-th tile of the i-th layer by a coding tree block unit.

When loop_filter_across_tiles_enabled_flag[i] has a value of 1, it is shown that in-loop filtering is performed on the tile boundary in the picture of the i-th layer. When loop_filter_across_tiles_enabled_flag[i] has a value of 0, it is shown that in-loop filtering is not performed on the tile boundary in the picture of the i-th layer. The In-loop filtering operation includes a deblocking filter operation and an adaptive offset filter operation. When a value of loop_filter_across_tiles_enabled_flag is not signaled, it is assumed that the value of loop_filter_across_tiles_enabled_flag is 1.

Like Table 10, the same information described above may be signaled in a supplemental enhancement information (SEI) message without transmitting the tile information in the VPS.

Further, the PPS may be revised so as to update the tile information signaled in the PPS only if necessary.

Table 11 is an example of a syntax illustrating a method of updating the tile information signaled in the PPS only if necessary according to the embodiment of the present invention.

TABLE 11

| pic_parameter_set_rbsp( ) { | Descriptor |
|---|---|
| ... | |
| if( nuh_layer_id = = 0 ) { | |
|   tiles_enabled_flag | u(1) |
| else | |
|   update_tiles_info_flag | u(1) |
| if(tiles_enabled_flag ‖ update_tiles_info_flag) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |
| } | |

Referring to Table 11, when tiles_enabled_flag has a value of 1, it is meant that all the pictures referring to the corresponding PPS include two or more tiles. When tiles_enabled_flag has a value of 0, it is meant that all the pictures referring to the PPS include only one tile. If the value of tiles_enabled_flag is not signaled, the value of tiles_enabled_flag is inferred as 0.

When update_tiles_info_flag has a value of 1, it is shown that the tile information of the pictures referring to the corresponding PPS is updated. When update_tiles_info_flag has a value of 0, it is shown that the tile information of the pictures referring to the corresponding PPS is not updated.

Second Embodiment

Table 12 is another example of the syntax illustrating a method of signaling tile information in a VPS according to the embodiment of the present invention.

TABLE 12

| vps_vui( ){ | Descriptor |
|---|---|
| ... | |
|   tiles_not_in_use_flag | u(1) |
|   if( !tiles_not_in_use_flag ){ | |
|     for( i = 0; i <= MaxLayersMinus1; i++ ){ | u(1) |
|       tiles_in_use_flag[i] | |
|       if( tiles_in_use_flag[i] ) { | |
|         default_tile_info_flag[i] | u(1) |
|         if(default_tile_info_flag[i] ) { | |
|           num_tile_columns_minus1[i] | ue(v) |
|           num_tile_rows_minus1[i] | ue(v) |
|           loop_filter_across_tiles_enabled_flag[i] | u(1) |
|         } | |
|       } | |
|     } | |
|   ... | |
| } | |

An update mechanism of the PPS may be applied only to the number of tiles and contents associated with the loop filter signaling.

TABLE 13

| pic_parameter_set_rbsp( ) { | Descriptor |
|---|---|
| ... | |
|   tiles_enabled_flag | u(1) |
|   if ( nuh_layer_id > 0 && tiles_enabled_flag ) | |
|     update_tiles_info_flag | u(1) |
|   if(tiles_enabled_flag) { | |
|     if(nuh_layer_id == 0 ‖ update_tiles_info_flag) { | |
|       num_tile_columns_minus1 | ue(v) |
|       num_tile_rows_minus1 | ue(v) |
|     } | |
|     uniform_spacing_flag | u(1) |
|     if( !uniform_spacing_flag ) { | |
|       for( i = 0; i < num_tile_columns_minus1;i++ ) | |
|         column_width_minus1[i] | ue(v) |
|       for( i = 0; i < num_tile_rows_minus1; i++ ) | |
|         row_height_minus1[i] | ue(v) |
|     } | |
|     if( nuh_layer_id == 0 ‖ update_tiles_info_flag) | |
|       loop_filter_across_tiles_enabled_flag | u(1) |
|   } | |
|   ... | |
| } | |

Semantics of the syntaxes illustrated in Tables 12 and 13 is the same as that of the syntaxes described in Tables 10 and 11 in the first embodiment.

Third Embodiment

Table 14 is yet another example of the syntax illustrating a method of signaling tile information in a VPS according to the embodiment of the present invention.

TABLE 14

| vps_extension( ){ | Descriptor |
|---|---|
| ... | |
|   for(i = 0; i <= MaxLayersMinus1; i++ ) { | |
|     default_tile_info_flag[i] | u(1) |
|     if(default_tile_info_flag[i] ) { | |
|       num_tile_columns_minus1[i] | ue(v) |
|       num_tile_rows_minus1[i] | ue(v) |
|     } | |
|   } | |
|   ... | |
| } | |

Semantics of the syntaxes illustrated in Table 14 is the same as that of the syntaxes described in Tables 10 and 11 in the first embodiment.

Fourth Embodiment

Table 15 is still yet another example of the syntax illustrating a method of signaling tile information in a VPS according to the embodiment of the present invention.

TABLE 15

| vps_extension( ){ | Descriptor |
|---|---|
| ... | |
|     for( i = 0; i <= MaxLayersMinus1; i++) { | |
|         min_max_tile_info_flag[i] | u(1) |
|         if(min_max_tile_info_flag[i] ) { | |
|             max_num_tile_columns_minus1[i] | ue(v) |
|             min_num_tile_columns_minus1[i] | ue(v) |
|             max_num_tile_rows_minus1[i] | ue(v) |
|             min_num_tile_rows_minus1[i] | ue(v) |
|         } | |
|     } | |
| ... | |
| } | |

Referring to FIG. 15, when min_max_tile_info_flag[i] has a value of 1, it is meant that a maximum tile number and a minimum tile number of the picture of the i-th layer included in the bitstream are signaled. When min_max_tile_info_flag[i] has a value of 0, it is meant that a maximum tile number and a minimum tile number of the picture of the i-th layer included in the bitstream are not signaled.

A value of max_num_tile_columns_minus1[i] plus 1 represents a maximum number of tile columns partitioning the picture of the i-th layer. When max_num_tile_columns_minus1[i] is not signaled, it is assumed that max_num_tile_columns_minus1[i] is 0.

A value of min_num_tile_columns_minus1[i] plus 1 represents a minimum number of tile columns partitioning the picture of the i-th layer. When min_num_tile_columns_minus1[i] is not signaled, it is assumed that min_num_tile_columns_minus1[i] is 0.

A value of max_num_tile_rows_minus1[i] plus 1 represents a maximum number of tile rows partitioning the picture of the i-th layer. When max_num_tile_rows_minus1[i] is not signaled, it is assumed that max_num_tile_rows_minus1[i] is 0.

A value of min_num_tile_rows_minus1[i] plus 1 represents a minimum number of tile rows partitioning the picture of the i-th layer. When min_num_tile_rows_minus1[i] is not signaled, it is assumed that min_num_tile_rows_minus1[i] is 0.

Fifth Embodiment

Table 16 is still yet another example of the syntax illustrating a method of signaling tile information in a VPS according to the embodiment of the present invention.

TABLE 16

| vps_extension( ){ | Descriptor |
|---|---|
| ... | |
|     for( i = 0; i <= MaxLayersMinus1; i++ ) { | |
|         max_tile_info_flag[i] | u(1) |
|         min_tile_info_flag[i] | u(1) |
|         if(max_tile_info_flag[i] ) { | |

TABLE 16-continued

| vps_extension( ){ | Descriptor |
|---|---|
|             max_num_tile_columns_minus1[i] | ue(v) |
|             max_num_tile_rows_minus1[i]] | ue(v) |
|         } | |
|         if(min_tile_info_flag[i] ) { | |
|             min_num_tile_columns_minus1[i] | ue(v) |
|             min_num_tile_rows_minus1[i] | ue(v) |
|         } | |
|     } | |
| ... | |
| } | |

Referring to FIG. 16, when max_tile_info_flag[i] has a value of 1, it is meant that a maximum tile number of the picture of the i-th layer included in the bitstream is signaled. When max_tile_info_flag[i] has a value of 0, it is meant that the maximum tile number of the picture of the i-th layer included in the bitstream is not signaled.

When min_tile_info_flag[i] has a value of 1, it is meant that a minimum tile number of the picture of the i-th layer included in the bitstream is signaled. When min_tile_info_flag[i] has a value of 0, it is meant that the minimum tile number of the picture of the i-th layer included in the bitstream is not signaled.

The embodiments 4 and 5 may be signaled in vps_vui( ).

Tile Information in SPS

Generally, since tile settings of pictures in a specific layer are the same as each other, another method describing the tile information may be described in the SPS. If the tile information in the VPS is not revised, the SPS may be revised like the following Table 17.

Table 17 is an example of the syntax illustrating a method of signaling tile information in the SPS according to the embodiment of the present invention.

TABLE 17

| seq_parameter_set_rbsp( ){ | Descriptor |
|---|---|
| ... | |
|     default_tile_setting_flag | u(1) |
|     if(default_tile_setting_flag ) { | |
|         num_tile_columns_minus1 | ue(v) |
|         num_tile_rows_minus1 | ue(v) |
|         uniform_spacing_flag | u(1) |
|         if( !uniform_spacing_flag ) { | |
|             for( i = 0; i < num_tile_columns_minus1; i++ ) | |
|                 column_width_minus1[ i ] | ue(v) |
|             for( i = 0; i < num_tile_rows_minus1; i++ ) | |
|                 row_height_minus1[ i ] | ue(v) |
|         } | |
|     } | |
| ... | |
| } | |

Since semantics of the syntaxes described in Table 17 is the same as that of the syntaxes signaling the tile information in the VPS described above, herein, the description thereof will be omitted.

Description of Non-Present Tile Sets

Regions (that is, tile regions or tile sets) which are independently decodable in one current CVS may be described in "inter-layer constrained tile sets SEI messages" and a "motion-constrained SEI message". In this case, outside area of the described regions (a region except for the regions which are independently decodable in the CVS) may be skipped without transmitting the encoded data to the corresponding portion.

Figure 4:
FIG. 4 is a diagram illustrating an empty tile area which is removed in one picture.

However, as illustrated in FIG. 4, an empty tile set which is intentionally removed later may exist. The empty tile set may be filled later by a device which exists on a content transfer path (used for an advertisement box and the like). To this end, it is useful that the decoder may determine which tile sets (that is, independently decodable regions) are removed.

The current "inter-layer constrained tile sets SEI messages" describes only the independently decodable regions, and does not describe which region is removed on the transfer path.

Accordingly, the present invention provides a method of describing information on tile sets so as to distinguish the removed region from the decodable regions in the picture.

For example, a flag may be added to each tile set defined so as to represent whether the tile set in the picture exists.

Table 18 is an example of a syntax illustrating a method of using a flag representing whether the tile set exists or not according to the embodiment of the present invention.

TABLE 18

| inter_layer_constrained_tile_sets( payloadSize ) { | Descriptor |
|---|---|
| il_all_tiles_exact_sample_value_match_flag | u(1) |
| il_one_tile_per_tile_set_flag | u(1) |
| if( !il_one_tile_per_tile_set_flag ) { | |
|   il_num_sets_in_message_minus1 | ue(v) |
|   if( il_num_sets_in_message_minus1 ) | |
|     skipped_tile_set_present_flag | u(1) |
|   numSignificantSets = il_num_sets_in_message_minus1 | |
|                       − skipped_tile_set_present_flag + 1 | |
|   for( i = 0; i < numSignificantSets; i++ ) { | |
|     ilcts_id[i] | ue(v) |
|     present_flag[i] | u(1) |
|     il_num_tile_rects_in_set_minus1[i] | ue(v) |
|     for( j = 0; | |
|     j <= il_num_tile_rects_in_set_minus1[i]; j++ ) { | |
|       il_top_left_tile_index[ i ][ j ] | ue(v) |
|       il_bottom_right_tile_index[ i ][ j ] | ue(v) |
|     } | |
|     ilc_idc[i] | u(2) |
|     if ( !il_all_tiles_exact_sample_value_match_flag ) | |
|       il_exact_sample_value_match_flag[ i ] | u(1) |
|   } | |
| } else | |
|   all_tiles_ilc_idc | u(2) |
| ... | |
| } | |

Referring to Table 18, when present_flag[i] has a value of 1, it is meant that the tile set recognized in the CVS exists. When present_flag[i] has a value of 0, it is meant that the tile set recognized in the CVS does not exist.

As another example, a new SEI message indicating whether each tile set exists in the CVS may be created. In this case, the "inter-layer constrained tile sets SEI message" should not be revised.

Revision of Representation Formats

Hereinafter, in the present invention, a method for improving the representation for "representation formats" described in the VPS and the SPS is proposed.

Table 19 is an example of a syntax illustrating a method of signaling representation formats according to the embodiment of the present invention.

TABLE 19

| vps_exterision( ) { | Descriptor |
|---|---|
| ... | |
| if( rep_format_idx_present_flag ) | |
|   for( i = 1, i <= vps_max_layers_minus1; i++ ) | |
|     if( vps_num_rep_formats_minus1 > 0 ) | |
|       vps_rep_format_idx[ i ] | u(4) |
| } | |
| ... | |
| } | |

Referring to Table 19, vps_rep_format_idx[i] represents an index for a list of a rep_format( ) syntax applied to the i-th layer.

The syntax of Table 19 may be revised like the following Table 20. When the syntax is revised like Table 20, there is benefit not to signal "for"-loop when vps_num_rep_formats_minus1=0 at a VPS parsing process in the decoder or a middle box.

Table 20 is another example of a syntax illustrating a method of signaling representation formats according to the embodiment of the present invention.

TABLE 20

| vps_extension( ) { | Descriptor |
|---|---|
| ... | |
| if( rep_format_idx_present_flag && | |
|   vps_num_rep_formats_minus1 > 0) | |
|   for( i = 1; i <= vps_max_layers_minus1; i++ ) | |
|     ~~if( vps_num_rep_format_minus1>0)~~ | |
|       vps_rep_format_idx[ i ] | u(4) |
| } | |
| ... | |
| } | |

When a size of a picture or a bit depth is changed only in some layers, in order to prevent signaling of the duplicated information, information on the representation format may be signaled like the following Table 21.

Table 21 is an example illustrating representation format syntax for improving that the duplicated information is signaled according to the embodiment of the present invention.

TABLE 21

| rep_format( ) { | Descriptor |
|---|---|
| chroma_size_vps_present_flag | u(1) |
| bit_depth_vps_preset_flag | u(1) |
| if(chroma_size_vps_present_flag ) { | |
|   chroma_format_vps_idc | u(2) |
|   if( chroma_format_vps_idc == 3 ) | |
|     separate_colour_plane_vps_flag | u(1) |
|   pic_width_vps_in_luma_samples | u(16) |
|   pic_height_vps_in_luma_samples | u(16) |
| } | |
| if(bit_depth_vps_present_flag ) { | |
|   bit_depth_vps_luma_minus8 | u(4) |
|   bit_depth_vps_chroma_minus8 | u(4) |
| } | |
| ... | |
| } | |

Referring to Table 21, when chroma_size_vps_present_flag has a value of 1, it is shown that information on a chroma format and a picture size is included in the syntax. When chroma_size_vps_present_flag has a value of 0, it is meant that the information on the chroma format and the picture size refers to rep_format( ) signaled before. The value of chroma_size_vps_present_flag of a first rep_format( ) needs to be 1.

When bit_depth_vps_present_flag has a value of 1, it is shown that information on the bit-depth is included in the syntax. When bit_depth_vps_present_flag has a value of 0, it is meant that information on the bit-depth refers to rep_format( ) signaled before. The value of bit_depth_vps_present_flag of a first rep_format( ) needs to be 1.

The size of a picture varies for each layer, but when the chroma format and the bit depth do not vary for each layer in many cases, in order to prevent the signaling of the duplicated information, information on the representation format may be signaled like the following Table 22.

Table 22 is another example illustrating representation format syntax for improving that the duplicated information is signaled according to the embodiment of the present invention.

TABLE 22

| rep_format( ) { | Descriptor |
|---|---|
| depth_chroma_vps_present_flag | u(1) |
| if(depth_chroma_vps_present_flag ) { | |
| chroma_format_vps_idc | u(2) |
| if( chroma_format_vps_idc  = =  3 ) | |
| separate_colour_plane_vps_flag | u(1) |
| bit_depth_vps_luma_minus8 | u(4) |
| bit_depth_vps_chroma_minus8 | u(4) |
| } | |
| pic_width_vps_in_luma_samples | u(16) |
| pic_height_vps_in_luma_samples | u(16) |
| ... | |
| } | |

Referring to Table 22, when depth_chroma_vps_present_flag has a value of 1, it is shown that information on a chroma format and bit-depth is included in the syntax. When depth_chroma_vps_present_flag has a value of 0, it is meant that the information on the chroma format and the bit-depth refers to rep_format( ) signaled before. In this case, the rep_format( ) signaled before may mean rep_format( ) applied to a layer below the layer to which a current rep_format( ) is applied. The value of depth_chroma_vps_present_flag of the first rep_format( ) needs to be 1.

Additionally, in the SPS, the update_re_format_flag may be replaced with update_chroma_size_flag representing that update information on the chroma format and the picture size exists and update_bit_depth_flag representing that update information on the bit-depth exists.

Table 23 is an example of a syntax illustrating a method of signaling update information on the chroma format, the picture size, and the bit-depth in the SPS according to the embodiment of the present invention.

TABLE 23

| seq_parameter_set_rbsp( ) { | Descriptor |
|---|---|
| ... | |
| if( nuh_layer_id > 0 ) { | |
| ~~update_rep_format_flag~~ | u(1) |
| update_chroma_size_flag | u(1) |
| update_bit_depth_flag | u(1) |
| } | |
| if( update_chroma_size_flag ) { | |
| chroma_format_idc | ue(v) |
| if( chroma_format_idc  = =  3 ) | |

TABLE 23-continued

| seq_parameter_set_rbsp( ) { | Descriptor |
|---|---|
| separate_colour_plane_flag | u(1) |
| pic_width_in_luma_samples | ue(v) |
| pic_height_in_luma_samples | ue(v) |
| } | |
| ... | |
| if( update_bit_depth_flag ) { | |
| bit_depth_luma_minus8 | ue(v) |
| bit_depth_chroma_minus8 | ue(v) |
| } | |
| ... | |
| } | |

Referring to Table 23, when update_chroma_size_flag has a value of 1, chroma_format_idc, separate_colour_plane_flag, pic_width_in_luma_samples, and pic_height_in_luma_samples are signaled in the SPS, and all layers in which the value of nuh_layer_id referring to the corresponding SPS is larger than 0 use the signaled values. In this case, the layers in which the value of nuh_layer_id is larger than 0 do not use values associated with the chroma_format_idc, the separate_colour_plane_flag, the pic_width_in_luma_samples, and the pic_height_in_luma_samples which are signaled in the VPS When update_chroma_size_flag has a value of 0, it is meant that the values of the chroma_format_idc, the separate_colour_plane_flag, the pic_width_in_luma_samples, and the pic_height_in_luma_samples are not signaled in the SPS, and all the layers referring to the corresponding SPS use the values of the chroma_format_idc, the separate_colour_plane_flag, the pic_width_in_luma_samples, and the pic_height_in_luma_samples which are signaled in the VPS. When the update_chroma_size_flag is not signaled, the value of the update_chroma_size_flag is regarded as 1.

When a current picture having a value of which the value of nuh_layer_id is larger than 0 (nuh_layer_id=layerIdCurr>0) refers to a specific SPS, the chroma_format_idc, the separate_colour_plane_flag, the pic_width_in_luma_samples, and the pic_height_in_luma_samples may be regarded as the following value or limited thereto.

When the value of nuh_layer_id of the activated SPS is 0, the values of the chroma_format_idc, the separate_colour_plane_flag, the pic_width_in_luma_samples, and the pic_height_in_luma_samples are regarded as chroma_format_idc, separate_colour_plane_flag, pic_width_in_luma_samples, pic_height_in_luma_samples of vps_ref_format_idx[j]-th rep_format( ) of the activated VPS. In this case, j is LayerIdxInVps [layerIdCurr], and the values of the chroma_format_idc, the separate_colour_plane_flag, the pic_width_in_luma_samples, and the pic_height_in_luma_samples which are signaled in the activated SPS are ignored.

When an active non-base layer refers to the SPS used even in the base layer, the values of the chroma_format_idc, the separate_colour_plane_flag, the pic_width_in_luma_samples, and the pic_height_in_luma_samples are inferred from the VPS, and in this case, the SPS has a value of nuh_layer_id which is 0. In an active base layer, values of the chroma_format_idc, the separate_colour_plane_flag, the pic_width_in_luma_samples, and the pic_height_in_luma_samples which are signaled in the activated SPS are applied.

When a value of nuh_layer_id of the activated SPS is larger than 0, the following is applied.

If a value of update_chroma_size_flag is 0, the values of the chroma_format_idc, the separate_colour_plane_flag, the pic_width_in_luma_samples, and the pic_height_in_luma_samples are regarded as chroma_format_idc, separate_colour_plane_flag, pic_width_in_luma_samples, pic_height_in_luma_samples of vps_ref_format_idx[j]-th rep_format( ) of the activated VPS. In this case, j is LayerIdxInVps[layerIdCurr].

If a value of update_chroma_size_flag is 1, the values of the chroma_format_idc, the separate_colour_plane_flag, the pic_width_in_luma_samples, and the pic_height_in_luma_samples are smaller than or equal to the value of the chroma_format_idc, the separate_colour_plane_flag, the pic_width_in_luma_samples, the pic_height_in_luma_samples of vps_ref_format_idx[j]-th rep_format( ) of the activated VPS. In this case, j is LayerIdxInVps[layerIdCurr].

When update_bit_depth_flag has a value of 1, bit_depth_luma_minus8 and bit_depth_chroma_minus8 are signaled in the SPS, and all the layers in which the value of nuh_layer_id referring to the corresponding SPS is larger than 0 use the signaled values. In this case, in a layer of which the value of nuh_layer_id is larger than 0, values associated with the bit_depth_luma_minus8 and the bit_depth_chroma_minus8 which are signaled in the VPS are not used.

When update_bit_depth_flag has a value of 0, it is shown that the values of the bit_depth_luma_minus8 and the bit_depth_chroma_minus8 are not signaled in the SPS, and all layers referring to the corresponding SPS use the value of the bit_depth_luma_minus8 and the bit_depth_chroma_minus8 which are signaled in the VPS. When the update_bit_depth_flag is not signaled, the value of the update_bit_depth_flag is regarded as 1.

When a current picture having a value of which the value of the nuh_layer_id is larger than 0 (nuh_layer_id=layerIdCurr>0) refers to a specific SPS, the bit_depth_luma_minus8 and the bit_depth_chroma_minus8 may be regarded as the following values or limited thereto.

When the value of the nuh_layer_id of the activated SPS is 0, the values of the bit_depth_luma_minus8 and the bit_depth_chroma_minus8 are regarded as bit_depth_luma_minus8 and bit_depth_chroma_minus8 of vps_ref_format_idx[j]-th rep_format( ) of the activated VPS. In this case, j is LayerIdxInVps[layerIdCurr], and the values of the bit_depth_luma_minus8 and the bit_depth_chroma_minus8 which are signaled in the activated SPS are ignored.

When an active non-base layer refers to the SPS used even in the base layer, the values of the bit_depth_luma_minus8 and the bit_depth_chroma_minus8 are inferred from the VPS, and in this case, the SPS has a value of the nuh_layer_id which is 0. In an active base layer, the values of the bit_depth_luma_minus8 and the bit_depth_chroma_minus8 which are signaled in the activated SPS are applied.

When a value of nuh_layer_id of the activated SPS is larger than 0, the following is applied.

When the value of the update_bit_depth_flag is 0, the values of the bit_depth_luma_minus8 and the bit_depth_chroma_minus8 are regarded as bit_depth_luma_minus8 and bit_depth_chroma_minus8 of vps_ref_format_idx[j]-th rep_format( ) of the activated VPS. In this case, j is LayerIdxInVps[layerIdCurr].

If the value of the update_bit_depth_flag is 1, the values of the bit_depth_luma_minus8 and the bit_depth_chroma_minus8 are smaller than or equal to the bit_depth_luma_minus8 and the bit_depth_chroma_minus8 of vps_ref_format_idx[j]-th rep_format( ) of the activated VPS. In this case, j is LayerIdxInVps[layerIdCurr].

Sps Max Sub Layers Minus1 Signaling Related in VPS Extension

The number of temporal sub-layers for each layer included in the bitstream may be signaled in a VPS extension.

Table 24 is an example of a syntax illustrating a method of signaling a maximum number of temporal sub-layers according to the embodiment of the present invention.

TABLE 24

| vps_extension( ) { | Descriptor |
| --- | --- |
| ... | |
| vps_sub_layers_max_minus1_present_flag | u(1) |
| if( vps_sub_layers_max_minus1_present_flag ) | |
| for( i = 0; i <= MaxLayersMinus1; i++ ) | |
| sub_layers_vps_max_minus1[i] | u(3) |
| ... | |
| } | |

Referring to Table 24, when vps_sub_layers_max_minus_present_flag is 1, it is shown that a value of sub_layer_vps_max_minus1[i] is signaled, and when the vps_sub_layers_max_minus_present_flag is 0, it is shown that the value of the sub_layer_vps_max_minus1[i] is not signaled.

Sub_layers_vps_max_minus1[i]+1 represents a maximum number of temporal sub-layers existing in the layer in which the value of the nuh_layer_id is layer_id_in_nuh[i]. The value of the sub_layers_vps_max_minus1[i] has a range of 0 to vps_max_sub_layers_minus1, and when the value of the sub_layers_vps_max_minus1[i] is not signaled, the value of the sub_layers_vps_max_minus1[i] is inferred as the value of the vps_max_sub_layers_minus1.

Meanwhile, in the SPS, when the layer referring to the corresponding SPS has the nuh_layer_id value of 0, sps_max_sub_layers_minus1 for representing a maximum number of temporal sub-layers of the corresponding layer is signaled. However, in the SPS, when the layer referring to the corresponding SPS has the nuh_layer_id value which is larger than 0, sps_max_sub_layers_minus1 for representing a maximum number of temporal sub-layers of the corresponding layer is not separately signaled. In this case, vps_max_sub_layers_minus1+1, which is a maximum number of temporal sub-layers existing in the entire bitstream instead of the maximum number of temporal sub-layers of the corresponding layer, is defined.

However, as described above, in the case of signaling the maximum number of temporal sub-layers for each layer in the VPS extension, it may be obvious that the value of the sps_max_sub_layers_minus1 in which the value of the nuh_layer_id is larger than 0 is defined as the following value of sub_layers_vps_max_minus1[i] value.

When the layer referring to the corresponding SPS has the value of the nuh_layer_id which is larger than 0, the sps_max_sub_layers_minus1+1 represents the maximum number of temporal sub-layers of the corresponding layer. The sps_max_sub_layers_minus1 has a value of 0 to 6. When the sps_max_sub_layers_minus1 is not signaled, it is inferred that the value of the sps_max_sub_layers_minus1 is the same as the value of sub_layers_vps_max_minus1[i] of the i-th layer in which the value of the nuh_layer_id is layer_id_in_nuh_[i].

Temporal Id Nesting Flag Signaling in VPS

Vps_temporal_id_nesting_flag signaled in the VPS is used for notifying that switching-up of the temporal sub-layers may be performed with respect to all the layers of the bitstream. That is, when the value of the vps_max_sub_layers_minus1 is larger than 0, the value of the vps_temporal_id_nesting_flag represents whether inter-screen prediction is additionally limited with respect to the CVS (coded video bitstream) referring to the corresponding VPS. When the value of the vps_max_sub_layers_minus1 is 0, the vps_temporal_id_nesting_flag needs to have a value of 0.

However, it may be useful that a decoder or a bitstream extractor determines whether switching-up may be performed for each layer without analyzing the SPS. Accordingly, a method of signaling temporal_id_nesting_flag representing whether switching-up may be performed for each layer in the VPS is proposed like the following Table 25.

Table 25 is an example of a syntax illustrating a method of signaling a flag representing whether switching-up may be performed for each layer according to the embodiment of the present invention.

TABLE 25

| vps_extension( ) { | Descriptor |
|---|---|
| ... | |
| vps_layer_temporal_id_nesting_present_flag | u(1) |
| if( vps_layer_temporal_id_nesting_present_flag ) | |
| far( i = 0: i <= MaxLayersMinus1 i++ ) | |
| vps_layer_temporal_id_nesting_flag[ i ] | u(1) |
| ... | |
| } | |

Referring to Table 25, when a value of vps_layer_temporal_id_nesting_present_flag is 1, it is shown that vps_layer_temporal_id_nesting_flag[i] exists. When the value of the vps_layer_temporal_id_nesting_present_flag is 0, it is shown that the vps_layer_temporal_id_nesting_flag[i] is not signaled.

When the sub_layers_vps_max_minus1[i] is larger than 0, the vps_layer_temporal_id_nesting_flag[i] represents whether the inter-screen prediction is additionally limited with respect to the picture of the i-th layer. When the sub_layers_vps_max_minus[i] is 0, the vps_layer_temporal_id_nesting_flag[i] needs to have a value of 1. When the vps_layer_temporal_id_nesting_flag[i] is not signaled, it is inferred that the vps_layer_temporal_id_nesting_flag[i] is the same as the value of the vps_temporal_id_nesting_flag.

In addition, semantics of the sps_temporal_id_nesting_flag signaled in the SPS may be revised as follows.

The sps_temporal_id_nesting_flag represents whether the inter-screen prediction is additionally limited with respect to the coded video stream (CVS) referring to the corresponding SPS, when the sps_max_sub_layers_minus1 is larger than 0.

When the value of the vps_temporal_id_nesting_flag is 1, the value of the sps_temporal_id_nesting_flag needs to be 1. When the sps_max_sub_layers_minus1 is 0, the value of the sps_temporal_id_nesting_flag needs to be 1. When the value of the sps_temporal_id_nesting_flag is not signaled, it is inferred that the value of the sps_temporal_id_nesting_flag is the same as the value of vps_layer_temporal_id_nesting_flag[i] of the i-th layer in which the value of the nuh_layer_id is layer_id_in_nuh_[i].

Figure 5:
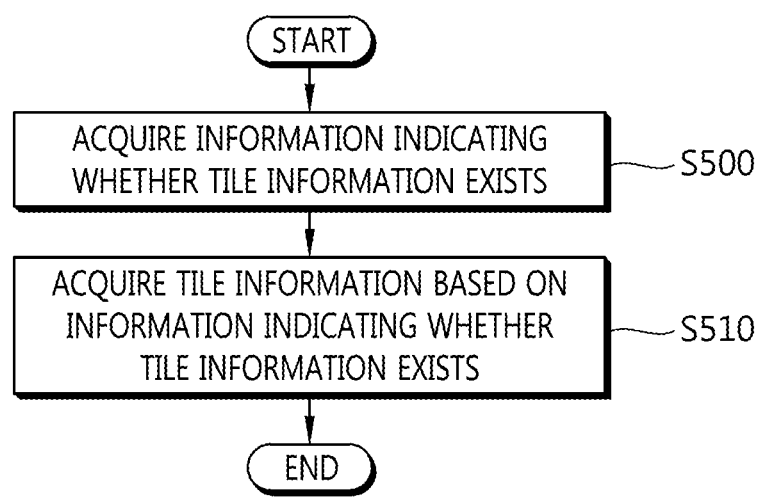
FIG. 5 is a flowchart schematically illustrating a method for acquiring tile information in the scalable video coding structure supporting the plurality of layers according to the embodiment of the present invention.

FIG. 5 is a flowchart schematically illustrating a method for acquiring tile information in the scalable video coding structure supporting the plurality of layers according to the embodiment of the present invention.

The method of FIG. 5 may be performed by the apparatus for video decoding (in more detail, the entropy decoding unit) of FIG. 2 described above. In the embodiment, for easy description, it is described that the method is performed by the decoding apparatus, but a reverse process thereof may be performed by the encoding apparatus.

Referring to FIG. 5, the decoding apparatus acquires information indicating whether tile information exists (S500).

The decoding apparatus may receive a scalable bitstream and entropy-decode the received bitstream to acquire information indicating whether the tile information exists.

The information indicating whether the tile information exists may be information representing whether a picture including two or more tiles among the pictures in the layer exists, as described above.

For example, when the picture including two or more tiles among the pictures in the layer exists, the information indicating whether the tile information exists may be set as that the tile information exists. On the contrary, when the picture including two or more tiles among the pictures in the layer does not exist, that is, when all the pictures in the layer include only one tile, the information indicating whether the tile information exists may be set as that the tile information does not exist.

The decoding apparatus acquires the tile information based on the information indicating whether the tile information exists (S510).

In the case of indicating that the tile information exists in the bitstream, the decoding apparatus may acquire the tile information through entropy decoding.

The tile information may be information representing whether locations of tiles existing in the picture of the current layer collocate with the locations of tiles existing in the picture of the reference layer referred to by the current layer. For example, as described above, the tile information may be tile_boundaries_aligned_flag.

The information indicating whether the tile information exists and the tile information may be transmitted from the encoder through the VPS, the PPS, the SPS, and the like.

The process of acquiring the tile information based on the information indicating whether the tile information exists according to the embodiment of the present invention described above may be performed like the syntax described in Tables 1 to 7, and may be applied in various combinations of the embodiments.

Figure 6:
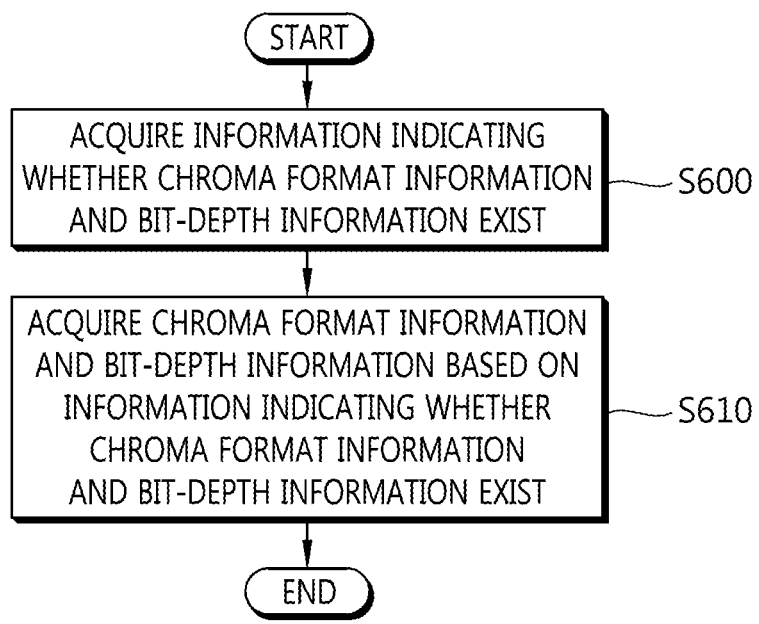
FIG. 6 is a flowchart schematically illustrating a method for acquiring representation format information in the scalable video coding structure supporting the plurality of layers according to the embodiment of the present invention.

FIG. 6 is a flowchart schematically illustrating a method for acquiring representation format information in the scalable video coding structure supporting the plurality of layers according to the embodiment of the present invention.

The method of FIG. 6 may be performed by the apparatus for video decoding (in more detail, the entropy decoding unit) of FIG. 2 described above. In the embodiment, for easy description, it is described that the method is performed by the decoding apparatus, but a reverse process thereof may be performed by the encoding apparatus.

Referring to FIG. 6, the decoding apparatus acquires information indicating whether the chroma format information and the bit-depth information exist (S600).

The decoding apparatus may receive a scalable bitstream and entropy-decode the received bitstream to acquire the information indicating whether the chroma format information and the bit-depth information exist.

The information indicating whether the chroma format information and the bit-depth information exist is described through Tables 19 to 23, and for example, may be rep_format_idx_present_flag, depth_chroma_vps_present_flag, chroma_size_vps_present_flag, bit_depth_vps_present_flag, and the like.

The decoding apparatus acquires the chroma format information and the bit-depth information based on the information indicating whether the chroma format information and the bit-depth information exist (S610).

In the case of indicating that the chroma format information and the bit-depth information exist in the bitstream, the decoding apparatus may acquire the chroma format information and the bit-depth information through entropy-decoding.

The chroma format information, as information on chroma and luma sampling, includes monochrome sampling, 4:2:0 sampling, 4:2:2 sampling, and 4:4:4 sampling chroma formats.

The monochrome sampling means a sample array constituted by only a luma array. The 4:2:0 sampling means that each of two chroma arrays has a ½ height and a ½ width of the luma array. The 4:2:2 sampling means that each of two chroma arrays has the same height and a ½ width of the luma array. The 4:4:4 sampling means that each of two chroma arrays has the same height and width as the luma array or is processed by monochrome sampling.

In the case of indicating that the chroma format information and the bit-depth information do not exist in the bitstream, the chroma format information may refer to the chroma format information signaled before, and the bit-depth information may refer to the bit-depth information signaled before.

The information indicating whether the chroma format information and the bit-depth information exist, the chroma format information, and the bit-depth information may be transmitted from the encoder through the VPS, the PPS, the SPS, the rep_format( ) which is the syntax describing the representation format information, and the like.

The process of acquiring the chroma format information and the bit-depth information based on the information indicating whether the chroma format information and the bit-depth information exist according to the embodiment of the present invention described above is described in Tables 19 to 23, and herein, the detailed description thereof will be omitted.

The method according to the present invention is prepared as a program for being executed in a computer to be stored in a computer-readable medium, and examples of the computer readable recording medium include ROM, RAM, CD-ROM, a magnetic tape, a floppy disk, an optical data storing device and the computer readable recording medium may also be implemented in a form of a carrier wave (for example, transmission through the Internet).

Further, the computer-readable recording media are distributed on computer systems connected through the network, and thus the computer-readable recording media may be stored and executed as the computer-readable code by a distribution scheme. Further, functional programs, codes, and code segments for implementing the method may be easily inferred by a programmer in a technical field to which the present invention belongs.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

While some embodiments of the present invention have been described with reference to the accompanying drawings, those skilled in the art may change, modify, and substitute the present invention in various ways without departing from the essential characteristic of the present invention. Accordingly, the various embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

The invention claimed is:

1. A method for video decoding supporting a plurality of layers with a decoding apparatus, the method comprising:
   decoding, with the decoding apparatus, a tiles not in use flag from a bitstream; and
   decoding, with the decoding apparatus, a tile boundaries aligned flag from the bitstream based on the tile not in use flag,
   wherein the tile not in use flag indicates whether all pictures belonging to a video sequence consist of a single tile,
   wherein the tile boundaries aligned flag indicates whether a current layer coincides with a reference layer in a boundary of the tile.

2. The method of claim 1, wherein the tiles not in use flag is signaled in response to a Video Usability Information (VUI) being present.

3. The method of claim 1, the method further comprising:
   decoding, with the decoding apparatus, a loop filter across titles enabled flag from the bitstream in response to the tile not in use flag being equal to 0,
   wherein the loop filter across tiles enabled flag indicates whether an in-loop filtering is performed across a boundary of a tile in a picture of the current layer.

4. The method of claim 1, wherein in response to the file not in use flag being equal to 0, the tile boundaries aligned flag is decoded from the bitstream,
   wherein in response to the tile not in use flag being equal to 1, the tile not in use flag indicates that all pictures belonging to a video sequences consist of a single tile.

5. A method for video encoding supporting a plurality of layers with a encoding apparatus, the method comprising:
   determining, with the encoding apparatus, whether all pictures belonging to a video sequence consist of a single tile;
   encoding, with the encoding apparatus, a tiles not in use flag based on the determination result;
   encoding, with the encoding apparatus, a tile boundaries aligned flag based on the tile not in use flag; and
   generating, with the encoding apparatus, a bitstream comprising either one or both of the tiles not in use flag and the tile boundaries aligned flag,
   wherein the tile not in use flag indicates whether all pictures belonging to a video sequence consist of a single tile,
   wherein the tile boundaries aligned flag indicates whether a current layer coincides with a reference layer in a boundary of the tile.

6. A non-transitory computer readable recording medium for storing a bitstream, wherein the bitstream is generated by a method for video encoding supporting a plurality of layers with a encoding apparatus, the method comprising:
   determining, with the encoding apparatus, whether all pictures belonging to a video sequence consist of a single tile;

encoding, with the encoding apparatus, a tiles not in use flag based on the determination result;
encoding, with the encoding apparatus, a tile boundaries aligned flag based on the tile not in use flag; and
generating, with the encoding apparatus, the bitstream comprising either one or both of the tiles not in use flag and the tile boundaries aligned flag,
wherein the tile not in use flag indicates whether all pictures belonging to a video sequence consist of a single tile,
wherein the tile boundaries aligned flag indicates whether a current layer coincides with a reference layer in a boundary of the tile.

* * * * *